US009664404B2

(12) United States Patent
Veltkamp et al.

(10) Patent No.: US 9,664,404 B2
(45) Date of Patent: May 30, 2017

(54) RECUPERATIVE CLIMATE CONDITIONING SYSTEM

(75) Inventors: Wessel Bart Veltkamp, GD Son (NL); Peter Hoogendoorn, RE Son (NL)

(73) Assignee: Level Holding B.V., Son (NL)

( * ) Notice: Subject to any disclaimer, the term of this patent is extended or adjusted under 35 U.S.C. 154(b) by 1205 days.

(21) Appl. No.: 11/911,493

(22) PCT Filed: Apr. 20, 2006

(86) PCT No.: PCT/NL2006/050093
§ 371 (c)(1),
(2), (4) Date: Apr. 9, 2008

(87) PCT Pub. No.: WO2007/001177
PCT Pub. Date: Jan. 4, 2007

(65) Prior Publication Data
US 2009/0032228 A1 Feb. 5, 2009

(30) Foreign Application Priority Data

Apr. 21, 2005 (NL) ..................... 1028830

(51) Int. Cl.
*F24F 12/00* (2006.01)
*F24F 3/147* (2006.01)

(52) U.S. Cl.
CPC ............ *F24F 12/003* (2013.01); *F24F 3/147* (2013.01); *F24F 2012/007* (2013.01); *Y02B 30/52* (2013.01); *Y02B 30/563* (2013.01)

(58) Field of Classification Search
CPC .......... F24F 3/147; F24F 12/00; F24F 12/001; F24F 12/002; F24F 12/003; F24F 12/006;
(Continued)

(56) References Cited

U.S. PATENT DOCUMENTS 5,024,263 A * 6/1991 Laine et al. .................. 165/283
5,441,103 A * 8/1995 Rezkallah ............ F24F 12/002
165/104.29
(Continued)

FOREIGN PATENT DOCUMENTS

EP 846923 A2 * 6/1998
EP 0846923 A2 6/1998
(Continued)

OTHER PUBLICATIONS

"Chapter 10 Refrigeration Cycles" Content taken from Text Book: Thermodynamics, 3rd Edition by Yunus A. Cengel Michael A. Boles; Publisher: McGraw-Hill Science/Engineering/Math; Publication Date: 1998.*
(Continued)

*Primary Examiner* — Marc Norman
(74) *Attorney, Agent, or Firm* — The Webb Law Firm

(57) ABSTRACT

Device for thermal energy exchange between a first medium flow and a second medium flow, including a heat exchanger that facilitates alternating of the direction of the media flows therethrough, a first supply duct for conducting the first medium flow connecting to the heat exchanger, a first exhaust duct for conducting the first medium flow connecting to the first exhaust duct, a second supply duct for conducting a second medium flow connecting to the heat exchanger, and a second exhaust duct for conducting the second medium flow connecting to the heat exchanger. The device also includes a first heat exchanger element placed in one of the ducts and a second heat exchanger element placed in one of the ducts, wherein the heat exchanger elements are both included in a Carnot circuit having an expansion device and a compressor. The heat exchanger exchanges both thermal energy and phase transition energy.

21 Claims, 14 Drawing Sheets

(58) Field of Classification Search
CPC .......... F24F 6/02; F24F 2012/007; F28F 9/02; F28F 9/0246; F28F 9/0253; F28F 9/0256; F28F 9/0265; F28F 9/0275; F28F 27/006; F28F 27/02
USPC ..... 62/159, 186, 160, 177, 232, 94, 271, 93, 62/304, 314; 165/104.31, 54, 909
See application file for complete search history.

(56) References Cited

U.S. PATENT DOCUMENTS

| | | | | |
|---|---|---|---|---|
| 5,809,791 | A | * | 9/1998 | Stewart, III .................... 62/115 |
| 6,062,296 | A | * | 5/2000 | Broberg .............................. 165/6 |
| 6,385,985 | B1 | * | 5/2002 | Bussjager ............... F24F 3/147 |
| | | | | 62/259.1 |
| 6,668,569 | B1 | * | 12/2003 | Jin .................................... 62/197 |
| 2004/0123615 | A1 | * | 7/2004 | Yabu ............................... 62/271 |
| 2004/0129011 | A1 | * | 7/2004 | Kikuchi et al. ................. 62/271 |
| 2004/0134211 | A1 | * | 7/2004 | Lee ....................... F24F 3/1423 |
| | | | | 62/271 |
| 2004/0250557 | A1 | * | 12/2004 | Yabu et al. ........................ 62/94 |
| 2005/0236136 | A1 | * | 10/2005 | Veltkamp et al. ................. 165/4 |
| 2005/0253019 | A1 | * | 11/2005 | Hoehne .................. B64D 11/02 |
| | | | | 244/129.1 |

FOREIGN PATENT DOCUMENTS

| | | | | |
|---|---|---|---|---|
| EP | 1408287 | A1 | 4/2004 | |
| EP | 1485657 | | 12/2004 | |
| JP | 2003232539 | A | 8/2003 | |
| JP | EP 1408287 | A1 * | 4/2004 | ........... B01D 53/261 |
| NL | WO 03085327 | A1 * | 10/2003 | ............ F24F 12/001 |
| WO | 03/085327 | A1 | 10/2003 | |
| WO | WO 2005036061 | A1 * | 4/2005 | |

OTHER PUBLICATIONS

Chapter 11 Refrigeration Cycles Content taken from Text Book: Thermodynamics : An Engineering Approach, 5th Edition by Yunus A. Cengel Michael A. Boles; Publisher: McGraw-Hill Science/Engineering/Math; Publication Date: Jun. 3, 2005.*
NPL document "AU 2004280426 B2" is the English equivalent of WO 2005036061 A1 by Matsui et al.*
Search Report for International Patent Application No. PCT/NL2006/050093; Sep. 12, 2006.

* cited by examiner

RECUPERATIVE CLIMATE CONDITIONING SYSTEM

PRIORITY CLAIM

This patent application is a U.S. National Phase of co-pending International Application No. PCT/NL2006/050093 filed Apr. 20, 2006, which claims priority to Netherlands Patent Application No. 1028830, filed Apr. 21, 2005, the disclosures of which are incorporated herein by reference in their entirety.

FIELD

The invention in question concerns a device for the exchange of thermal energy between a first medium flow from outside to inside an area to be conditioned and a second medium flow from inside the area to be conditioned to the outside, whereby the device contains: a heat exchanger placed between an outside and an inside, a first supply duct for the conduction of the first medium flow connecting to the outside of the heat exchanger, a first exhaust duct for the conduction of the first medium flow connecting to the inside of the heat exchanger, a second supply duct for the conduction of a second medium flow connecting to the inside of the heat exchanger, of which the direction of flow is opposite to that of the first medium flow, and a second exhaust duct for the conduction of the second medium flow connecting to the outside of the heat exchanger, which is provided with a first heat exchanger element placed in one of the ducts on the outside, and a second heat exchanger element placed in one of the ducts on the inside, wherein the first and second heat exchanger elements are both included in a Carnot circuit that further comprises an expansion device and a compressor.

BACKGROUND

Such a device is known from EP-A-0 846 923.

Such a recuperative climate conditioning system is normally used for cooling hot humid air to climatise areas. With cooling an area, the heat exchanger element for the cooling is generally placed in the duct for the air supply to the area, and the heat exchanger element for the heat to be removed from the cold-heat machine is generally placed in the duct for the air exhaust to the outside. With heating an area, the heat exchanger element for heating is generally placed in the duct for the air supply to the area, and the heat exchanger element for extracting the heat from the outside air to the cold-heat machine is generally placed in the duct for the air exhaust to the outside.

By placing the heat exchanger elements according to the prior art in the medium flows that exit the heat exchanger, only part of the potential enthalpy is used in the heat exchanger.

A greater temperature difference is achieved across the heat exchanger and thus also a greater range in which the latent heat is transferred by placing the cooling heat exchanger element in the medium flow that goes into the heat exchanger on the cold side of the heat exchanger and by placing the heating heat exchanger element in the medium flow that goes out of the heat exchanger on the hot side of the heat exchanger.

With this well-known device, only perceptible heat is exchanged between the two medium flows. By applying the Carnot circuit, the temperature difference between the medium flows and thus the transfer of heat is admittedly increased, but this requires a heat exchanger with an even greater transfer of heat. Such a heat exchanger with a greatly increased heat transfer is obtained because the heat exchanger is set for the exchange of both thermal energy and phase transition energy. A heat exchanger that is set for the transfer of phase transition energy is also known as an enthalpy recuperator. Such a device is itself known from EP-A-1 485 657.

SUMMARY

According to a first preferred embodiment, the connections of the compressor and the expansion device in the Carnot circuit are exchangeable with respect to the heat exchanger elements and the Carnot circuit is adapted to transfer thermal energy in the same direction as the energy transfer of the first medium flow.

The cold-heat machine, also called a heat pump, usually consists of a compressor that compresses the gas phase, an expansion device and two heat exchanger elements, of which the one that emits heat and in which the medium is condensed is called a condenser, and the other, which absorbs heat and in which the medium evaporates, is called an evaporator.

According to the invention in question, with cooling an area, the evaporator is preferably placed in the medium flow that enters the heat exchanger from the area to be conditioned and the condensor in the medium flow that enters the heat exchanger from the outside.

According to the invention in question, with heating an area, the evaporator is preferably placed in the medium flow that enters the heat exchanger from the outside and the condensor in the medium flow that leaves the heat exchanger to the area to be conditioned.

The evaporator with cooling and the condensor with heating can be the same heat exchanger element, and the condensor with cooling and the evaporator with heating can also be the same heat exchanger element if the flow direction in the heat-cold machine is changed by a four-way valve when switching from cooling to heating and vice versa.

According to another preferred embodiment, the device is switched to heat the area to be conditioned and the first heat exchanger element is placed in the first supply duct. When the area to be conditioned is heated, there is a thermodynamic possibility of placing the first heat exchanger element in the first supply duct or in the second exhaust duct. It has appeared to the inventor that, in the latter case, there is a danger of the first heat exchanger element freezing, so that it is preferred to place the first heat exchanger element in the first supply duct.

Yet another preferred embodiment is provided by placing the second heat exchanger element in the first exhaust duct.

The heat exchanger elements are utilised to a maximum when the medium flow on the air side is opposite to that of the medium flow on the side of the cold-heat machine. For this purpose, a four-way valve preferably connects the heat exchanger element in which the medium flows from outside the heat exchanger to the cold-heat machine on the medium side of this machine. With heating, the evaporator is placed in the medium flow that flows from outside to the heat exchanger, so that the medium can be cooled to a maximum of the condensation temperature, whereby, even with an outside temperature below zero, heat can be extracted from the outside air without freezing.

In the configuration according to the prior art, wherein the evaporator is placed in the medium flow that leaves the heat exchanger to the outside, this is not possible, considering the medium leaves the heat exchanger at the condensation temperature and, with an outside temperature below zero degrees, freezes immediately in the heat exchanger element.

Yet another preferred embodiment is provided by the feature that allows the connection of the first supply duct to the heat exchanger and the connection of the second exhaust duct to be connected together by a bypass connection.

Here, it is noted that, instead of using the above-mentioned specially-applied bypass duct which includes a special valve, the bypass connection can also be implemented by a partly-opened position of valves between the first supply duct and the heat exchanger, or between the second exhaust duct and the heat exchanger, wherein control devices for the valves are set to control the valves to this partly-opened position. It should be clear that this embodiment can achieve the same effects as the previously-mentioned embodiment, but that the technical embodiment is much simpler, albeit that the control of the valves will have to be heavily modified.

The state of the regulating valve in the bypass duct and the capacity of the fans is so regulated that the condensation temperature is just not reached and the required heating capacity is supplied. With this, the heating capacity increases without freezing occurring, which greatly improves the applicability of the invention in cold climates.

According to another preferred embodiment, the device is switched to cool the area to be conditioned, wherein the first heat exchanger element is placed in the first supply duct. This configuration makes it possible to apply the optimum configuration with heating, without structural modifications to the installation. After all, with heating, it is preferred to place the first heat exchanger element in the first exhaust duct. With the measure according to the claim in question, this configuration can also be used with cooling without adding extra valves or ducts or using fans with a reversible flow.

Especially when the outside air is dry and hot, this cooling process can be executed in an exceptionally effective way when the first heat exchanger element is switched to transfer heat from the Carnot circuit to the air coming from the outside. After all, with this configuration, the loss in the recuperator, which by the way is compensated by regained latent heat with humid outside air, can be prevented.

Yet another preferred embodiment is provided by the measure where the recuperator is set for the counter-phase control of the exchanger elements of the recuperator on the inside.

With this, the direction of flow in the area to be conditioned is reversed, so that a simpler system is obtained and displacement ventilation can be applied, whereby the sick-building syndrome is countered and energy consumption is reduced.

Yet another embodiment is provided by the measure where a bypass connection is present between the first heat exchanger element and the second heat exchanger element. This configuration is preferably switched on when there is a need for cooling inside and when the outside temperature is lower than the desired inside temperature. In this configuration, the first heat exchanger element is used for cooling. The outgoing air is heated by the second heat exchanger element and removed to the outside by the actual heat exchanger.

Preferably, means will be purchased to reverse the direction of flow of the Carnot circuit in the first heat exchanger element. As a result, the counter-flow principle will be maintained in the first heat exchanger element.

A specific preferred embodiment is provided by the measure where the second supply duct and the second exhaust duct are connected together by a closable bypass connection. With this, the recuperator's regulating range can extend over a greater part of the whole.

According to yet another preferred embodiment, the first supply duct can be connected to both sides of the heat exchanger and the first exhaust duct can be connected to both sides of the heat exchanger. With this, it is possible to completely bypass the heat exchanger.

This effect can also be achieved when the first exhaust duct and the first supply duct are connected together by a closable bypass connection.

In both the above-mentioned situations, we obtain a sort of short circuit between the two sides of the heat exchanger. To be able to control the gas flows through these connections, it is attractive when the flow through the heat exchanger can also be regulated outside the valve in the relevant bypass connection. It is therefore attractive when the control device is at least adapted for the partial closing of valves present on one side of the heat exchanger when opening a bypass connection.

To make adiabatic cooling possible, an evaporator is preferably placed in the first exhaust duct between the heat exchanger and the first heat exchanger element. As a result, the cooling machine does not need to be switched on until later, whereby the added moisture is removed to the outside.

When there is dry hot outside air, it can be attractive to cool not only this outside air adiabatically, but moreover to subject the inside air to an adiabatic cooling process. This can be achieved when an evaporator is installed in the second supply duct.

To obtain a simple configuration, a transport pump for the medium is preferably placed in the first supply duct and in the second exhaust duct, whereby the medium pump placed in the first supply duct is placed upstream from the first heat exchanger element.

An important application of the device according to the invention is obtained when the device is switched as an air conditioning device.

Although many other embodiments are by no means excluded, important advantages of the invention in question, such as a small space requirement and a low energy consumption, are especially relevant when the air conditioning device is set for installation in a camping vehicle.

It is also possible to apply the air conditioning device in a building. Here, the available area is usually but not always less limited; however, the energy savings and the improvement in comfort are of the greatest importance. Such a building can be formed by an office or a house, but also by other areas to be conditioned, such as cold stores.

With application in a house or an office, it is attractive when, with heating the area to be conditioned, the first exhaust duct is adapted to direct the first medium to the ceiling of the area to be conditioned and the second exhaust duct is adapted to exhaust the medium in the vicinity of the bottom of the area to be conditioned and, with cooling the area to be conditioned, the first exhaust duct is adapted to direct the first medium to the bottom of the area to be conditioned and the second exhaust duct is adapted to exhaust the medium from the vicinity of the ceiling of the area to be conditioned. As a result of these measures, the air flows are adapted such that optimum comfort and minimum energy consumption are obtained.

BRIEF DESCRIPTION OF THE DRAWINGS

The invention in question will now be explained on the basis of the following figures:

FIG. 3AB: A diagram corresponding with FIG. 2, in which the medium flows are shown in the second switch position in the heating mode;

FIG. 3AC: A diagram corresponding with FIG. 2, in which the medium flows are shown in the second switch position in the heating mode with opened bypass connection;

FIG. 3BB: A diagram corresponding with FIG. 2, in which the medium flows are shown in the second switch position in the cooling mode;

DETAILED DESCRIPTION

Figure 1A:
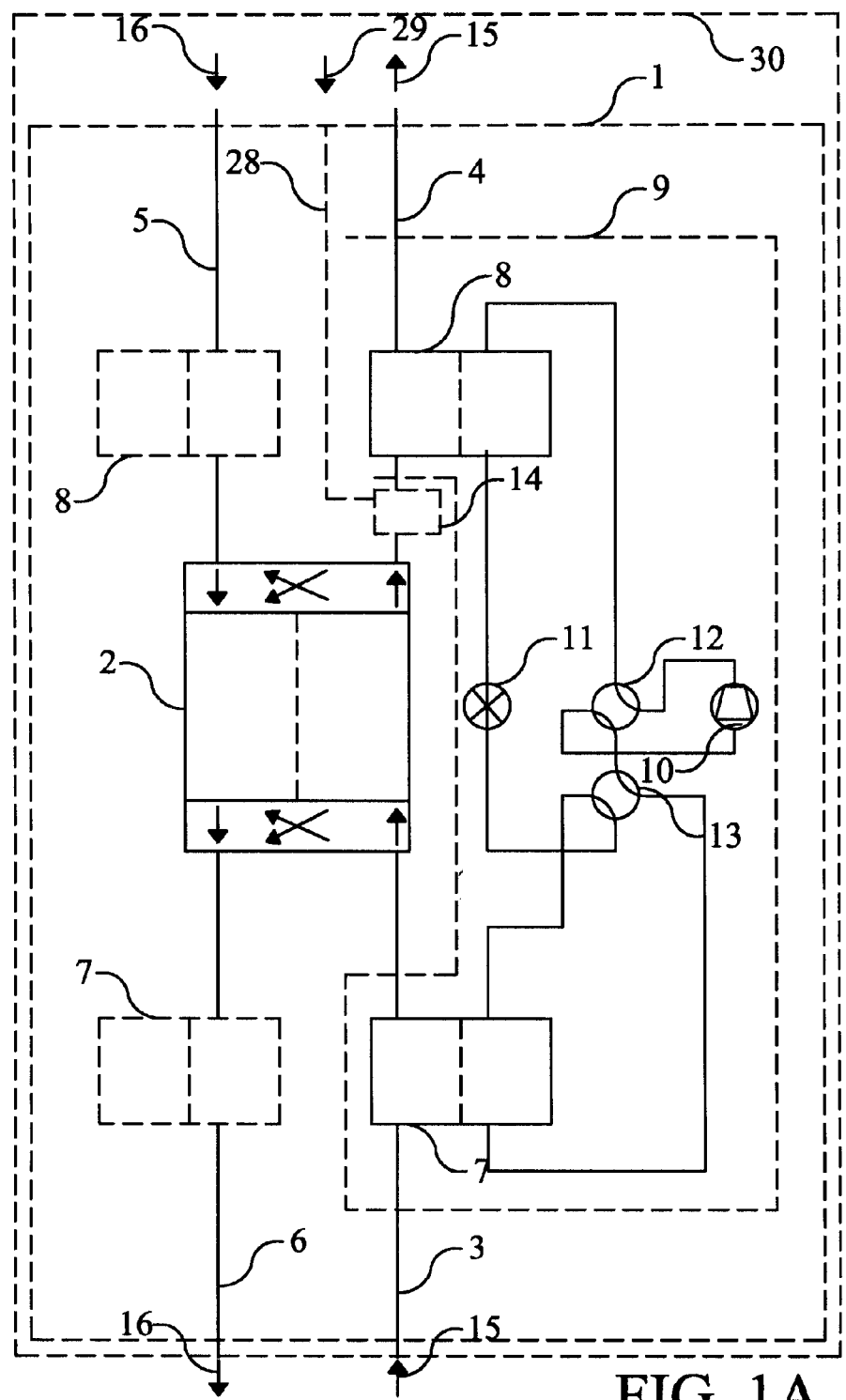
FIG. 1A: A diagram of the basic embodiment of the invention in the heating mode.

The device according to the invention indicated in its entirety by 1 as shown in FIG. 1A contains a heat exchanger 2, which is set not only to exchange perceptible heat but also to exchange condensation and evaporation heat. This is achieved by alternating the media flows through heat exchanger 2. This principle is described in EP-A-1 485 657. The device is placed in a wall between two areas, of which one is indicated as outside and the other as inside, to help understanding of the term. The area to be conditioned 30 is indicated by inside, while the area outside it is indicated by outside.

From the outside, a first supply duct 3 extends to the heat exchanger. A first exhaust duct 4 extends from the heat exchanger to the inside. A second supply duct 5 extends from the inside to the heat exchanger and a second exhaust duct 6 extends from the heat exchanger 2 to the outside. In the normal situation, medium flow 15 fed to heat exchanger 2 by the first supply duct 3 exits the heat exchanger through the first exhaust duct 4. Also in the normal situation, medium flow 16 fed to heat exchanger 2 by the second supply duct 5 exits heat exchanger 2 through the second exhaust duct 6. The device described up to now corresponds with the recuperator or heat exchanger according to the state of the technique.

A first heat exchanger element 7 is placed in the first supply duct 3, while a second heat exchanger element 8 is placed in the first exhaust duct 4. This concerns the preferred embodiment; it is, however, also possible to place the first heat exchanger element 7 in the second exhaust duct 6 and to place the second heat exchanger element 8 in the second supply duct 5, as indicated in FIG. 1A with dashed lines. An essential aspect here is that the first heat exchanger element 7 is placed on the outside and the second heat exchanger element 8 is placed on the inside.

As an option, an evaporator 14 is added between the second heat exchanger element 8 and heat exchanger 2. This evaporator serves for the adiabatic cooling and is fed by a medium flow 29 through supply duct 28.

The first and the second heat exchanger elements 7 and 8 are included in a Carnot circuit 9, which further contains a compressor 10, an expansion device 11, an evaporator/condensor 7 and a condensor/evaporator 8. To change the direction of the heat flow through the Carnot circuit, a four-way valve 12 is fitted. To change the direction of the medium flow of the Carnot circuit through heat exchanger element 7, a four-way valve 13 is fitted, so that counterflow operation is always possible.

With the above-depicted configuration, the area is heated on the inside. The first-cold-medium flow 15 is further cooled in the first heat exchanger element 7, i.e. gives its heat to Carnot circuit 9. Heat transfer takes place in heat exchanger 2, so that the first medium flow 15 is heated with the heat coming from the second medium flow 16. Next, the first medium flow leaves heat exchanger 2 and is further heated in the second heat exchanger element 8 by the heat coming from the Carnot circuit 9. By applying Carnot circuit 9, the temperature difference in heat exchanger 2 is increased, so that the heat transfer is more effective. Here, the four-way valve 12 is switched for heat transfer from the first heat exchanger element 7 to the second heat exchanger element 8. The four-way valve 13 is switched such that there is counterflow in heat exchanger element 7.

Figure 1B:
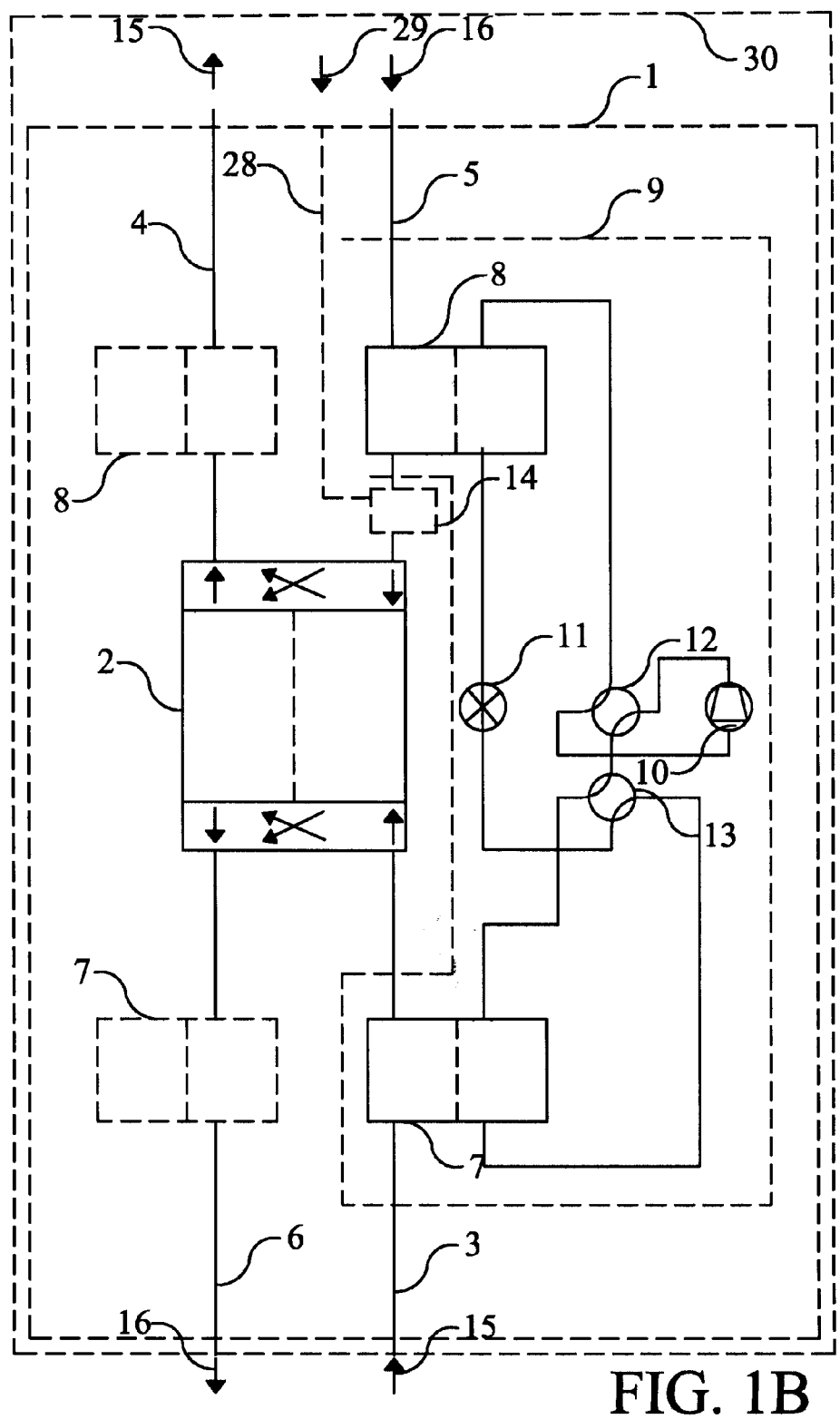
FIG. 1B: A diagram corresponding with FIG. 1A of the device in the cooling mode.

FIG. 1B shows the same device, whereby the heat transfer direction is reversed. Here, heat is transferred from the inside to the outside. In principle, this is achieved by reversing the heat transport direction in the Carnot circuit. This is easily achieved by means of four-way valve 12. The four-way valve 13 is so switched that we again have counterflow in heat exchanger element 7.

By the way, with this embodiment, it is attractive to place the second heat exchanger element 8 in the second supply duct 5 instead of in the first exhaust duct 4. This can naturally be achieved by changing the connections with respect to the situation shown in FIG. 1A, but it can also be achieved by letting the valve systems connected on one side with the heat exchanger 2 operate in counter-phase. No constructional modifications are required for this to obtain the advantages of this alternative placing.

Figure 2:
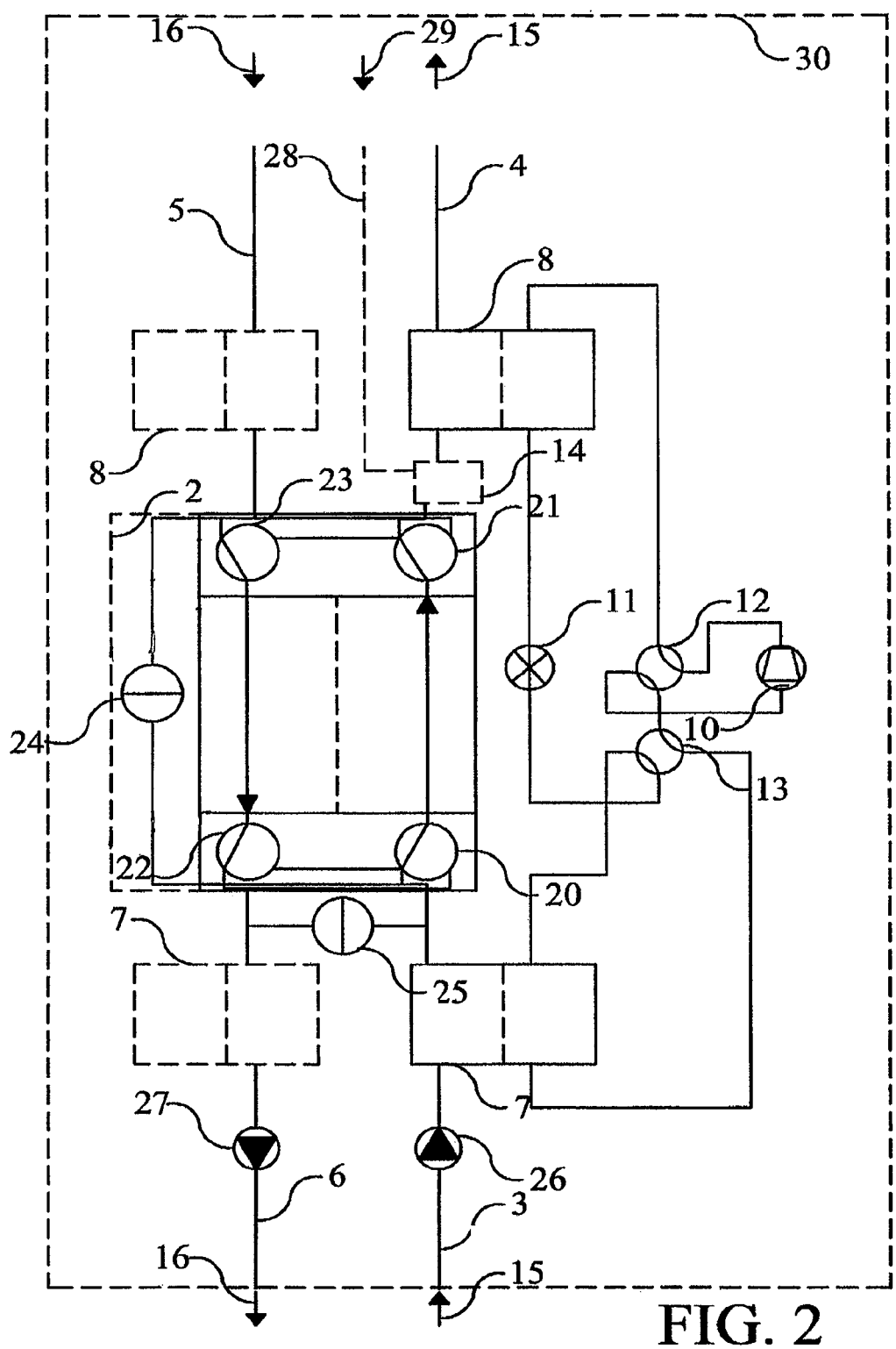
FIG. 2: A diagram of a preferred embodiment, whereby two-way valves are placed on both sides of the heat exchanger.

These connections between supply and exhaust ducts 3-6 and the actual heat exchanger 2, also called a recuperator, are obtained by simultaneously controllable valves 20, 22, and 21, 23, respectively, see FIG. 2. The construction of such valves can be seen in European Patent Application EP-A-1 485 657. The whole of recuperator 2 and controllable valves 20, 22, and 21, 23, respectively, is called an enthalpy recuperator and is indicated in its entirety by 2.

The embodiment depicted in FIG. 2 deviates further from the embodiment depicted in FIGS. 1A and 1B through the presence of a bypass connection, which contains valve 24 between the first supply duct 3 and the first exhaust duct 4. The function of this valve is explained later on the basis of FIG. 3AC.

Also, another bypass connection is indicated between the first supply duct and the second exhaust duct, which is used to be able to extract a greater power during heating with a constant temperature difference across heat exchanger element 7 without freezing occurring or to realise a lower temperature for the Carnot circuit during cooling.

Pumps or fans are required to let the media flows flow; pump 26 is fitted in the first supply duct and pump 27 is placed in the second exhaust duct. In this case, it is constructionally attractive to place both pumps 26 and 27 on the same side, the outside of the device, so that the heat exchanger's sound damping is utilised.

Figure 3A:
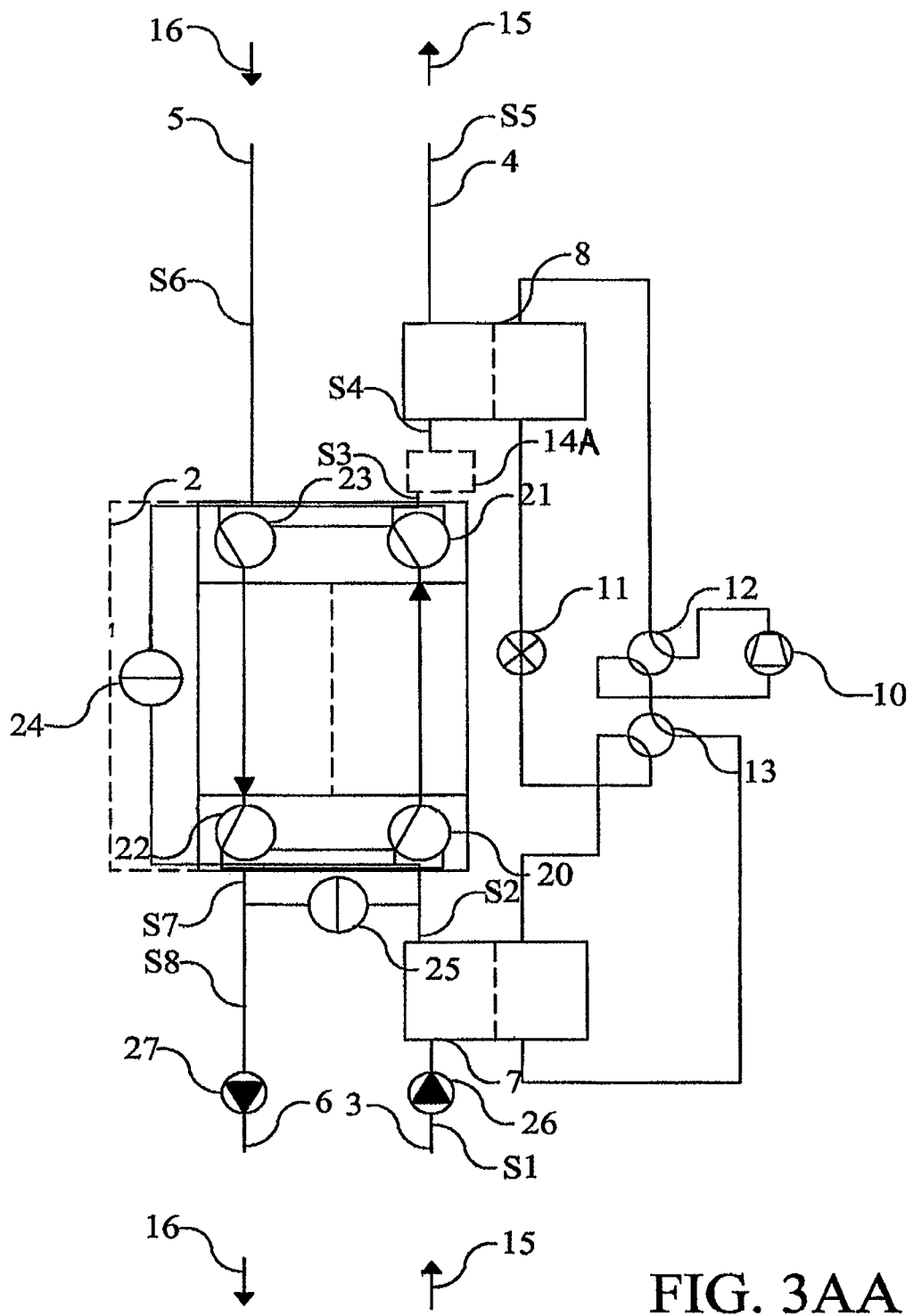
FIG. 3AA: A diagram corresponding with FIG. 2, in which the medium flows are shown in the first switch position in the heating mode.
Figure 3A:
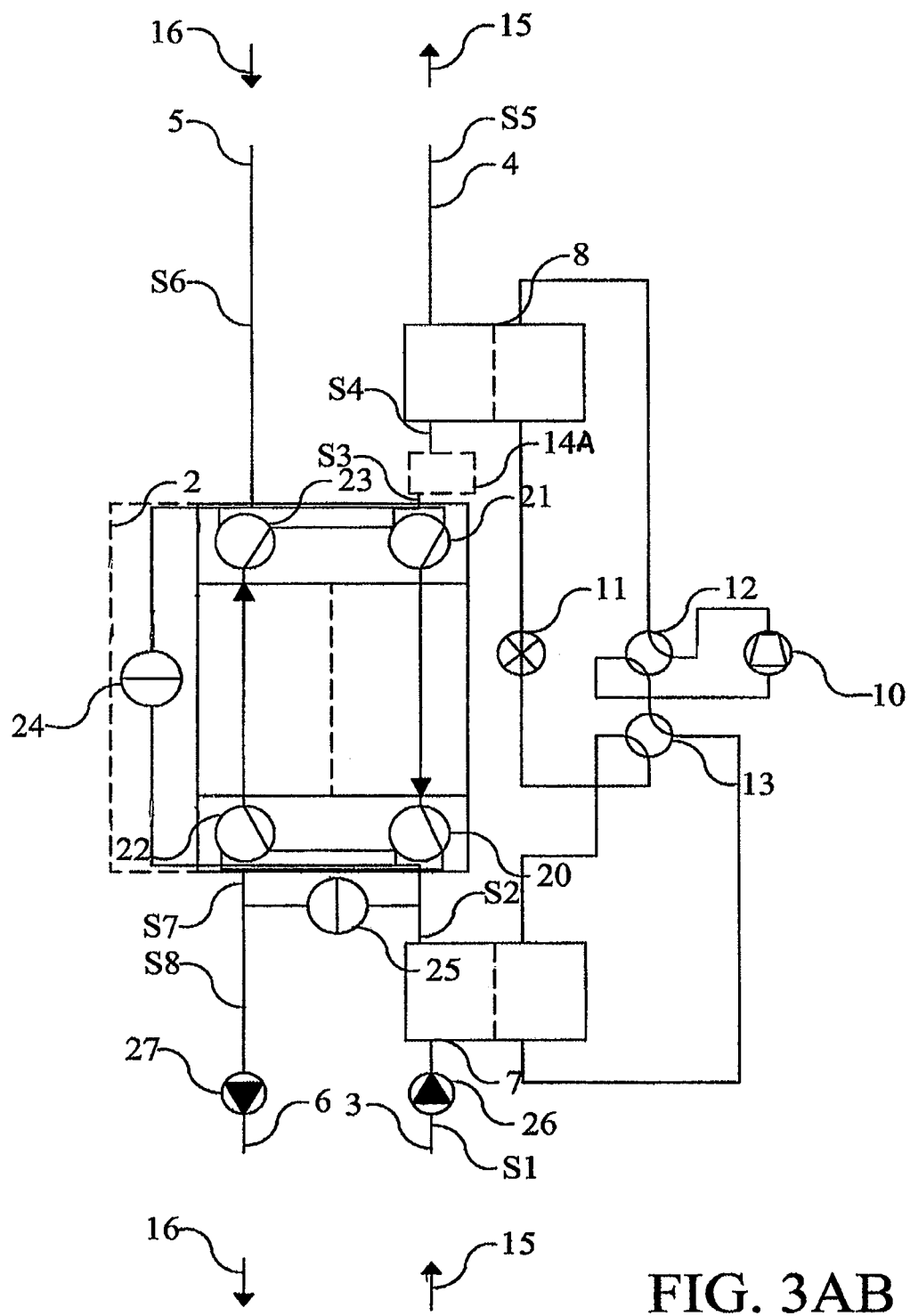
Figure 3A:
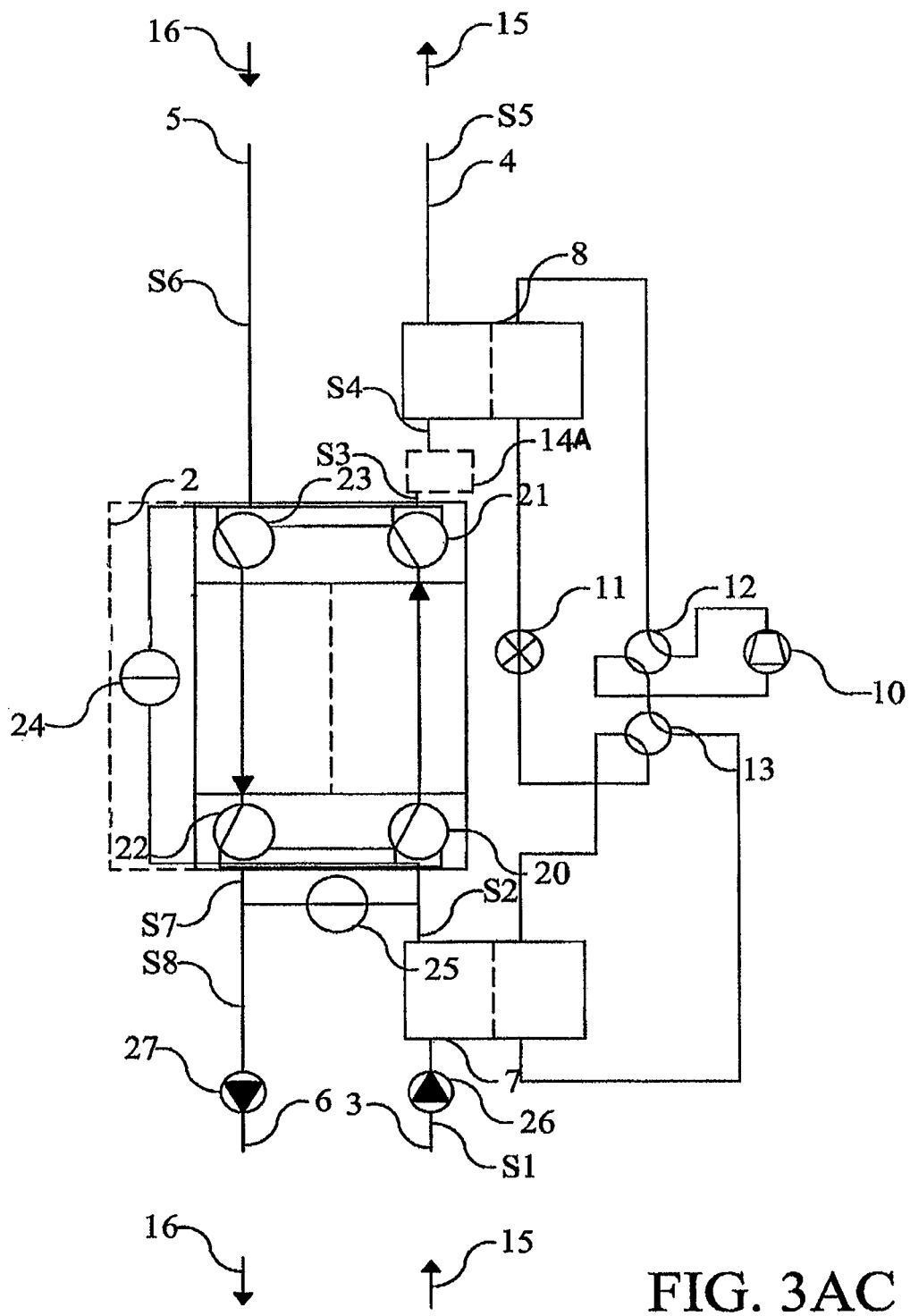
Figure 4A:
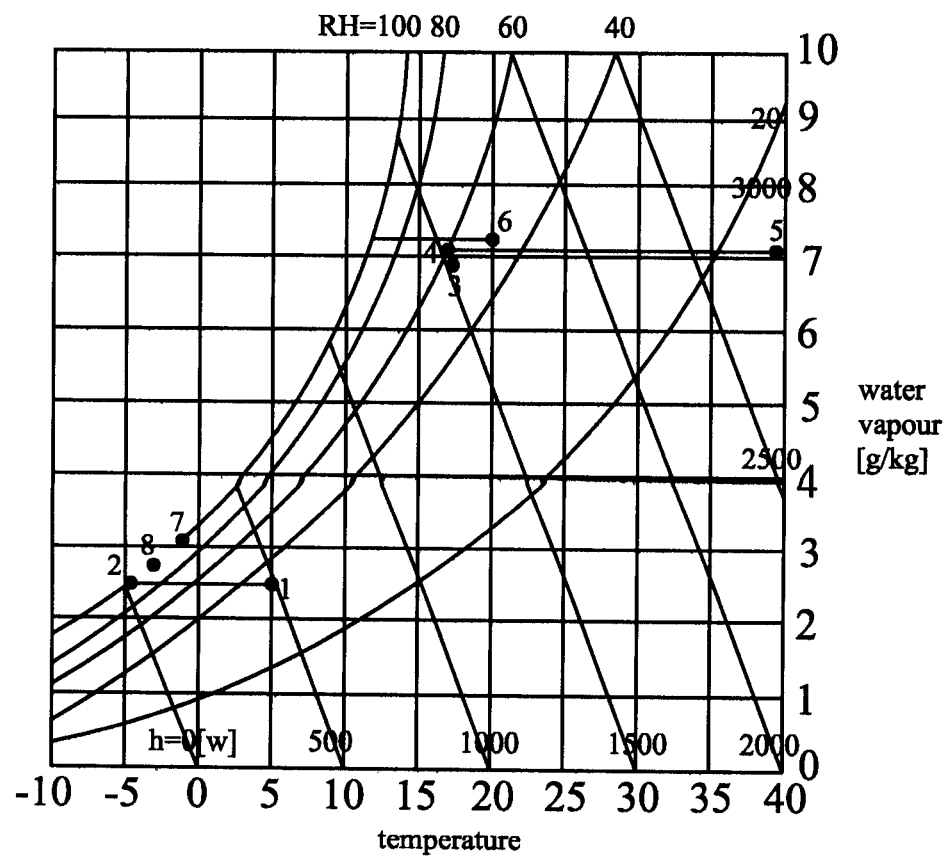
FIG. 4A: An enthalpy diagram that relates to the situation shown in FIGS. 3AA, 3AB and 3AC.

FIGS. 3AA, 3AB and 3AC show a diagram of the system, with S1 to S8 indicating the points of which the temperature and humidity are indicated in FIG. 4A for heating in an enthalpy diagram.

FIG. 3AA shows valves 20, 21, 22 and 23 in the first switch position; FIG. 3AB shows the valves in the second switch position and FIG. 3AC shows the valves in the first switch position, whereby bypass valve 25 is opened to enlarge the flow through heat exchanger element 7. The frequency of switching from state 1 to state 2 is so regulated that no condensate leaves heat exchanger 2 and no enthalpy is lost.

FIGS. 3AA, 3AB and 3AC show positions S1-S8, which are referred to in the explanation of FIG. 4A. Here, position S1 is at the input of the outside of the first supply duct 3, on the outside of pump 26, position S2 is after the first heat exchanger element 7, position S3 is after heat exchanger 2, position S4 is after the humidifier 14A and position S5 is after the outlet opening of the first exhaust duct. These positions concern the first medium flow 15.

Position S6 concerns the position at the inlet opening of the second supply duct, position S7 concerns the position between heat exchanger 2 and the second exhaust duct, and position S8 concerns the position for pump 27, downstream from bypass duct. These positions concern the second medium flow 16.

The process is characterised by following the temperature and humidity of ingoing and outgoing medium flows 15 and 16 on their path through the climate conditioning system in an enthalpy diagram, which simultaneously shows these quantities, the enthalpy flow for an air flow of 150 m3h-1, the relative and absolute humidity.

With heating, of which situation FIG. 4A shows the enthalpy diagram, an outside condition, position S1, of 5° C. and a relative humidity of 50% and an inside condition of 20° C. and a relative humidity of 50%, position 6, is taken as an example. The outside air is cooled to the condensation point in the first heat exchanger element 7, position S2, to a temperature of −4.5° C. and a relative humidity of 100%. Bypass valve 25 is regulated such that the flow through the first heat exchanger element 7 is so high that the 100% relative humidity level is not exceeded and thus freezing cannot occur. In heat exchanger 2, this first medium flow 15 then absorbs water that was obtained through condensation in the previous switching period. This first medium flow 15 is further heated and moistened in heat exchanger 2 and remains saturated up to the point in heat exchanger 2 where condensation of the second medium flow 16 starts. Next, the air of the first medium flow 15 is heated further still, but the moisture content remains constant. The first medium flow 15 leaves the heat exchanger 2 at a temperature of 18.1° C., position S3.

If desired, the relative humidity can be increased in humidifier 14A to the desired value, whereby the first medium flow 15 is cooled adiabatically to position S4. Next, the first medium flow 15 enters the second heat exchanger element 8, whereby the condensation heat of the Carnot circuit is used to heat the air of the first medium flow 15 to the desired value, to provide the heat requirement of the area to be conditioned, position S5, whereby the moisture content remains constant.

This air is fed to the area to be conditioned and mixes with the air present to the desired conditions of 20° C. and 50% relative humidity, position S6, in this example.

The second medium flow 16 from the area to be conditioned, position S6, is added to heat exchanger 2, which cools this air flow 16 to saturation in the first part of heat exchanger 2. This second medium flow 16 is further cooled and the water vapour is condensed, whereby the 100% relative humidity line is followed in the diagram of FIG. 4A. Here, the condensation heat is directly transferred to the first medium flow 15 on the other side of heat exchanger 2, where it is converted to evaporation heat. The second medium flow 16 leaves the heat exchanger 2 at a temperature of −2.6° C. and a relative humidity of 100%, according to position S7. After mixing air from the first medium flow 15 according to position S2, the second medium flow 16 leaves the system at a temperature of −3.5° C. and a relative humidity of 100%, position S8.

As a result of the enthalpy exchange, the performance of the heat pump increases by 77% in this example and freezing of the first heat exchanger element 7 and the heat exchanger 2 is avoided.

Figure 3B:
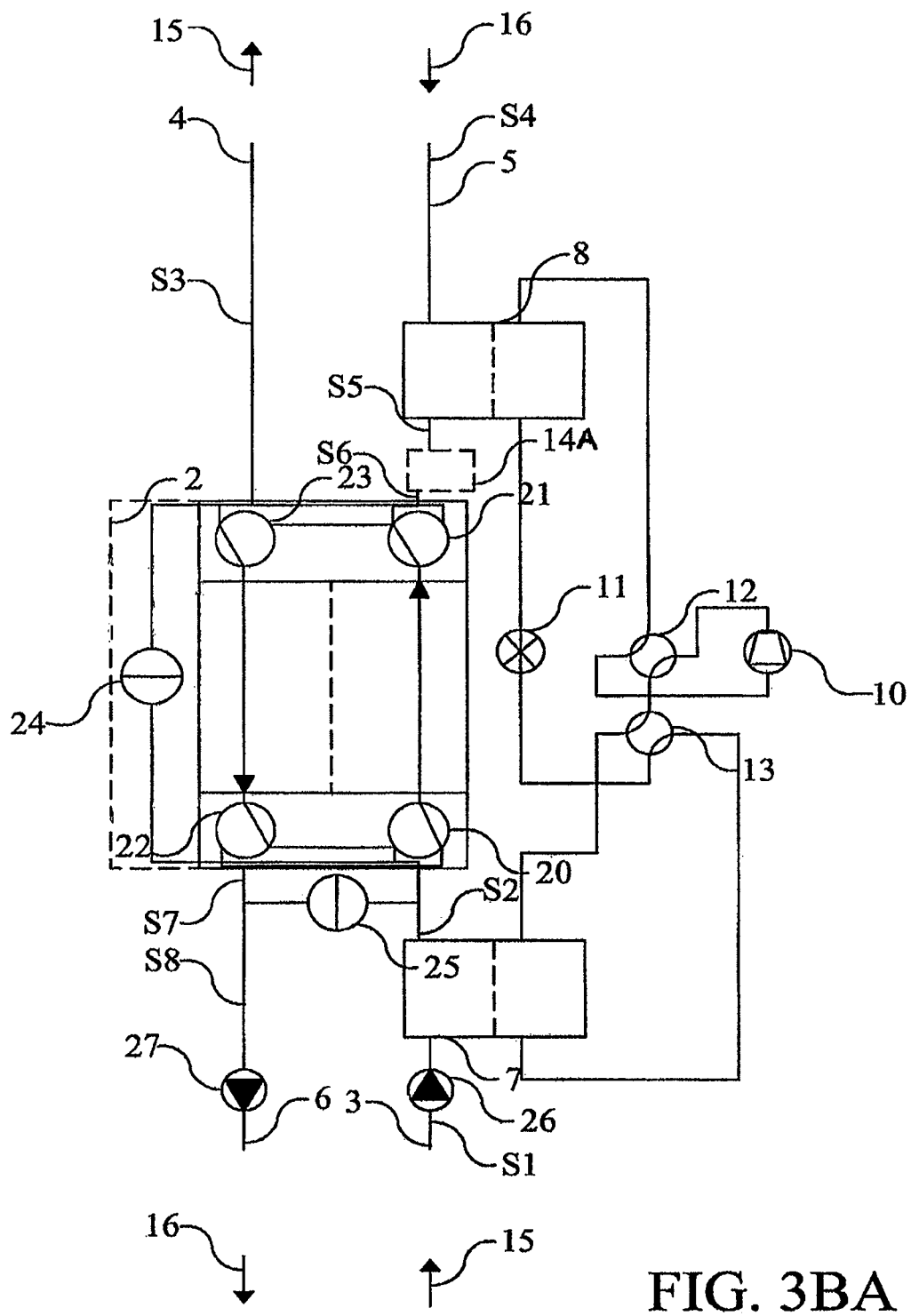
FIG. 3BA: A diagram corresponding with FIG. 2, in which the medium flows are shown in the first switch position in the cooling mode.
Figure 3B:
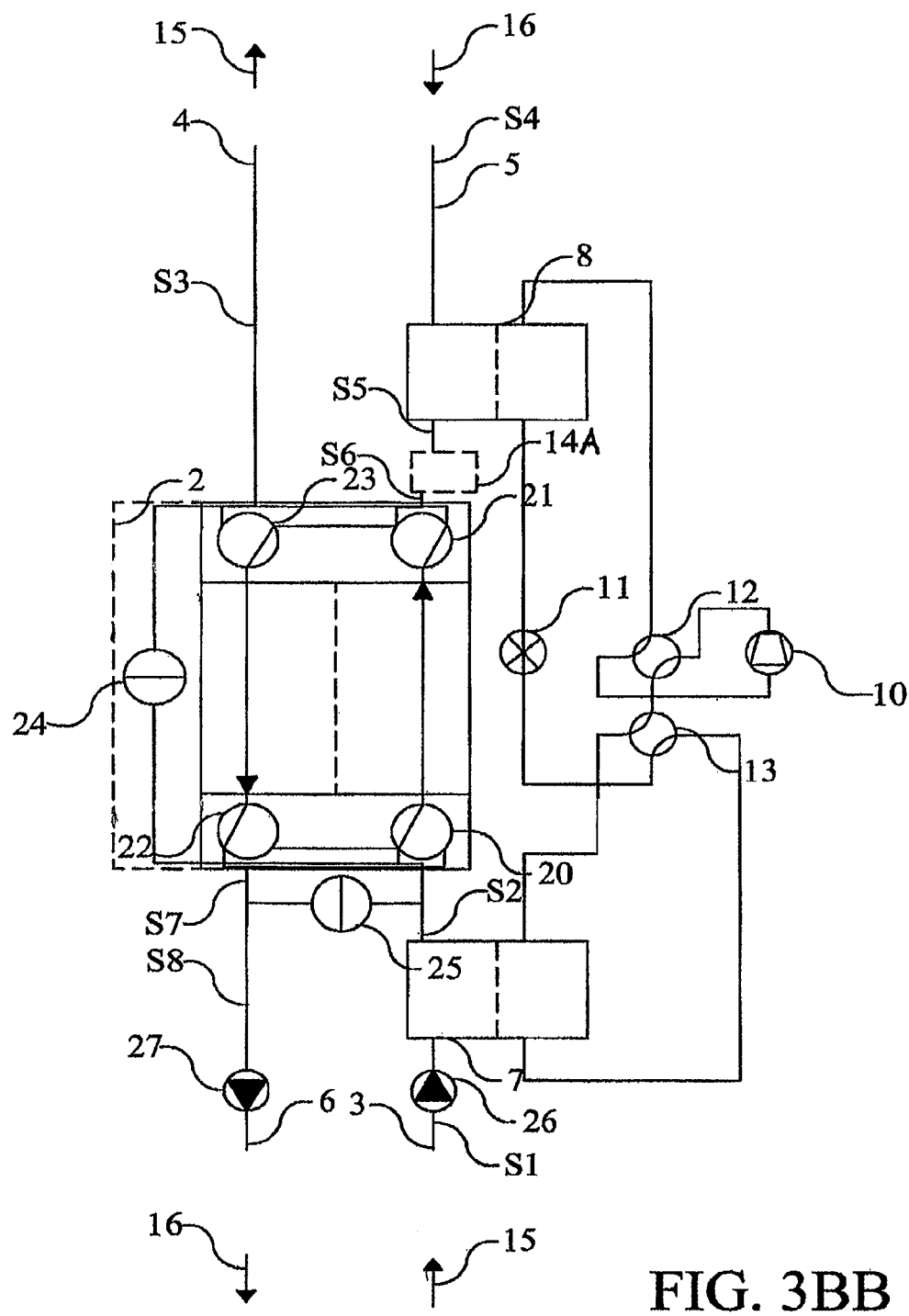
Figure 4B:
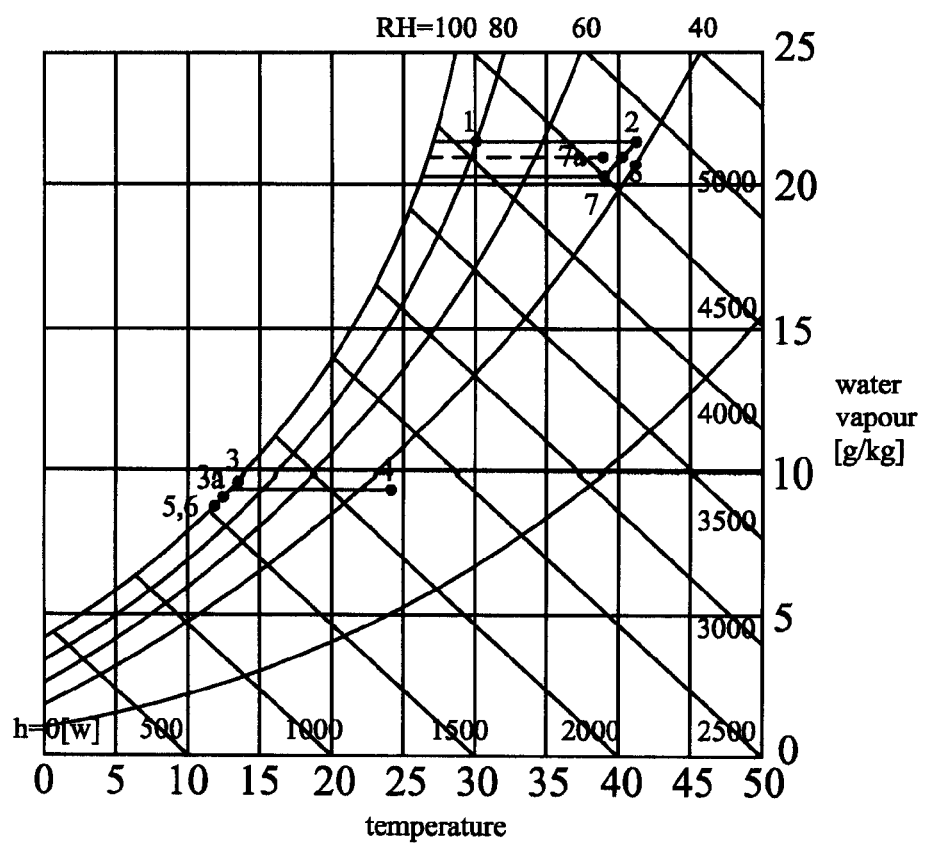
FIG. 4B: An enthalpy diagram that relates to the situation shown in FIGS. 3BA and 3BB.

With cooling, of which FIGS. 3BA and 3BB show the situation and FIG. 4B shows the appropriate diagram, an outside condition, position S1, of 30° C. and a relative humidity of 80% and an inside condition of 24° C. and a relative humidity of 50%, position S4 is taken as example.

FIG. 3BA shows valves 20, 21, 22 and 23 in the first switch position, whereby the first exhaust duct 4 is exchanged with the first supply duct 3, just as the first medium flow 15 and the second medium flow 16 on the inside. FIG. 3BB shows valves 20, 21, 22 and 23 in the second switch position.

The outside air is first heated in the first heat exchanger element 7, whereby bypass valve 25 is regulated such that the temperature of position S2 is limited to a value whereby the heat-cold machine formed by the Carnot circuit is still sufficiently effective, in this example 41.4° C., position S2. Next, the first medium flow is added to heat exchanger 2. Here, the first medium flow 15 first cools with a constant moisture content until the condensation point is reached. After this, first medium flow 15 cools further and condenses according to the 100% relative humidity line. The first medium flow 15 leaves heat exchanger 2 at a temperature of 13.3° C. and a relative humidity of 100%, as shown in position S3. With these characteristics, the air of the first medium flow 15 goes to the area to be conditioned. Now, the air is mixed with the air in the area to be conditioned and reaches the desired inside condition of 24° C. and 50% relative humidity, as shown by position S4.

The second medium flow 16 from the area to be conditioned, according to position S4, is added to the second heat exchanger element 8 and cools until 100% relative humidity is reached. After this, there is further cooling and condensation forms to a temperature of 11.1° C. with a relative humidity of 100%, as shown by positions S5 and S6. Next, the second medium flow 16 is added to heat exchanger 2 and heated, whereby the condensate that condensed during the previous switching period and is present on heat exchanger 2's duct walls evaporates. The evaporation heat is directly extracted from the condensation heat that is produced on the other side of heat exchanger 2 in the first medium flow. When the condensation point of the first medium flow 15 is reached in heat exchanger 2, the moisture content remains constant and the temperature of the second medium flow 16 increases further. This second medium flow 16 leaves heat exchanger 2 at a temperature of 39.1° C. and a relative humidity of 45%, as shown by position S7, after which after there is mixing with the first medium flow 15 through bypass valve 25 at a temperature of 40.1° C. and a relative humidity of 46%, as shown by position S8.

By adding the condensate that is formed in second heat exchanger element 8 to heat exchanger 2, the cooling capacity is increased and the supply temperature of the first medium flow to the area becomes 12.3° C., position S3*a*; the exhaust temperature of the second medium flow from the heat exchanger becomes 38.1° C., position S7*a* and the temperature of the air exhaust becomes 40.1° C., position S8. As a result of the enthalpy exchange, the performance of the cold-heat machine that is implemented in the Carnot circuit increases by 83% in this example.

Figure 3C:
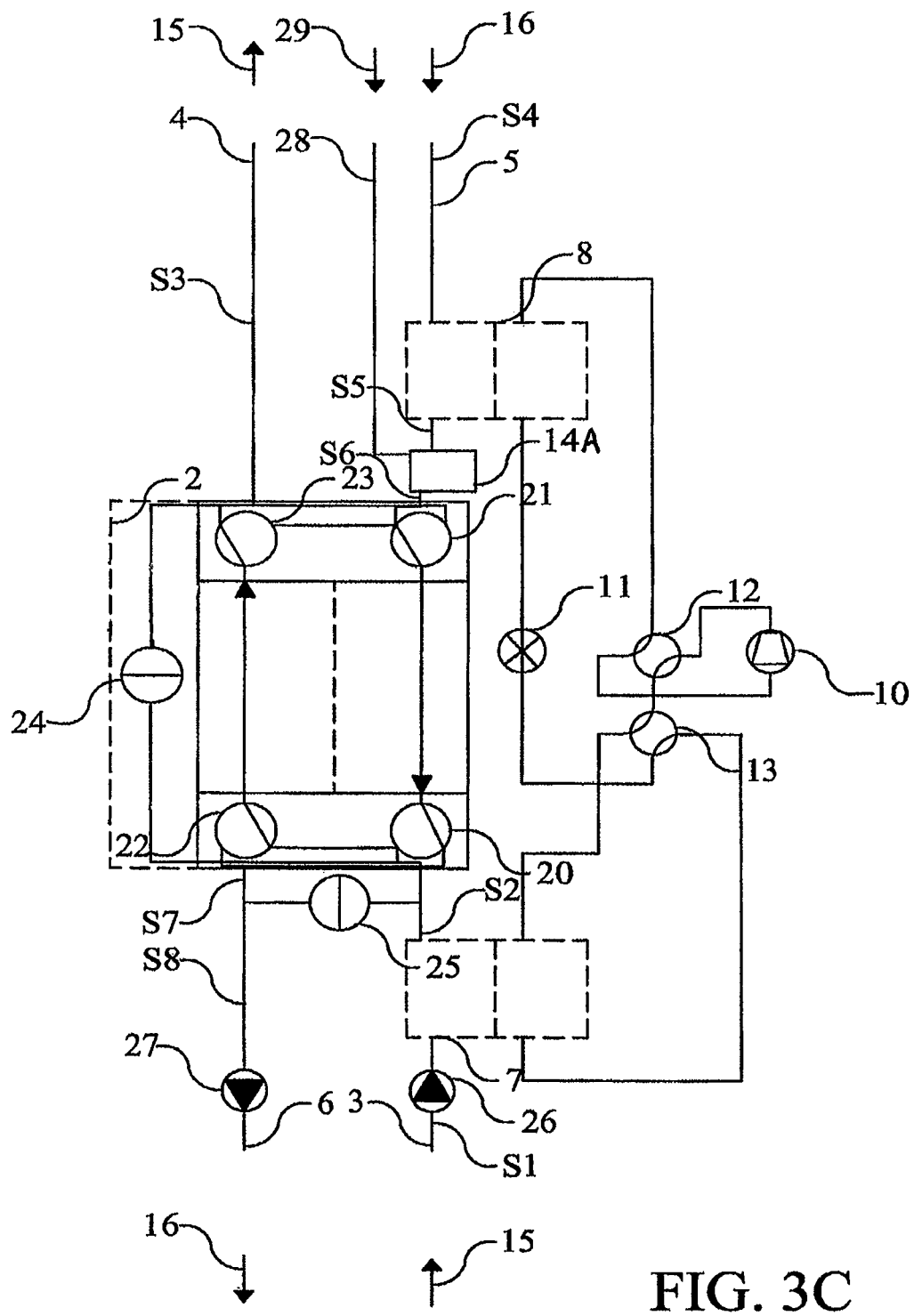
FIG. 3C: A diagram corresponding with FIG. 2, in which the medium flows are shown in the mode in which adiabatic cooling is used.
Figure 4C:
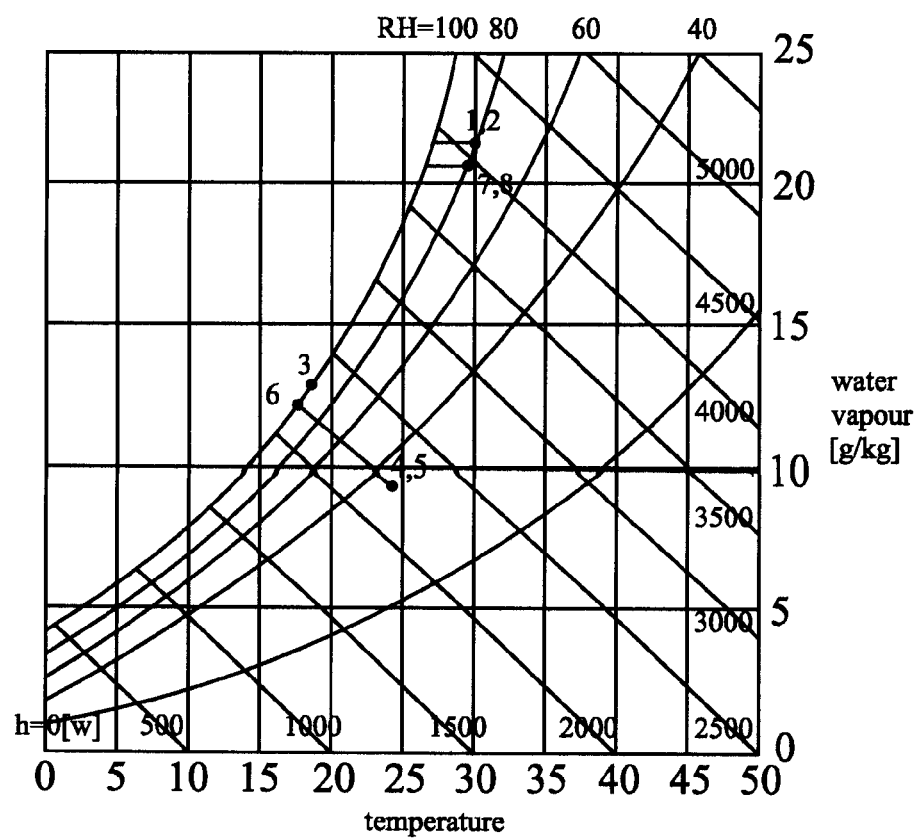
FIG. 4C: An enthalpy diagram that relates to the situation shown in FIG. 3C.

FIG. 3C shows a diagram of the system, with S1 to S8 indicating the points of which the temperature and humidity are indicated in an enthalpy diagram in FIG. 4C for adiabatic cooling.

With adiabatic cooling, an outside condition, position S1, of 30° C. and a relative humidity of 80% and an inside condition of 24° C. and a relative humidity of 50%, position S4, is taken as an example. In heat exchanger 2, the first medium flow 15 cools first with a constant moisture content until the condensation point is reached. Next, the first medium flow 15 cools further and condenses according to the 100% relative humidity line. The first medium flow 15 leaves heat exchanger 2 at a temperature of 18° C., with a relative humidity of 100%, position S3. After this, the air is mixed with the air in the area to be conditioned and reaches the desired inside conditions of 24° C. and 50% relative humidity, position S4.

The second medium flow 16 from the area to be conditioned, position S4, is added to humidifier 14A and cools with constant enthalpy until 100% relative humidity is reached at a temperature of 17° C., position S6. After this, the second medium flow 16 is added to heat exchanger 2 and heated, whereby the condensate present on the wall from the previous switching period evaporates. The evaporation heat is directly extracted from the condensation heat that is produced on the other side of heat exchanger 2 in the first medium flow 15. When the condensation point of the first medium flow in the heat exchanger 2 is reached, the moisture content remains constant and the temperature increases further. The second medium flow 16 leaves heat exchanger 2 at a temperature of 29° C. and a relative humidity of 82%, as represented by position S8.

Figure 3D:
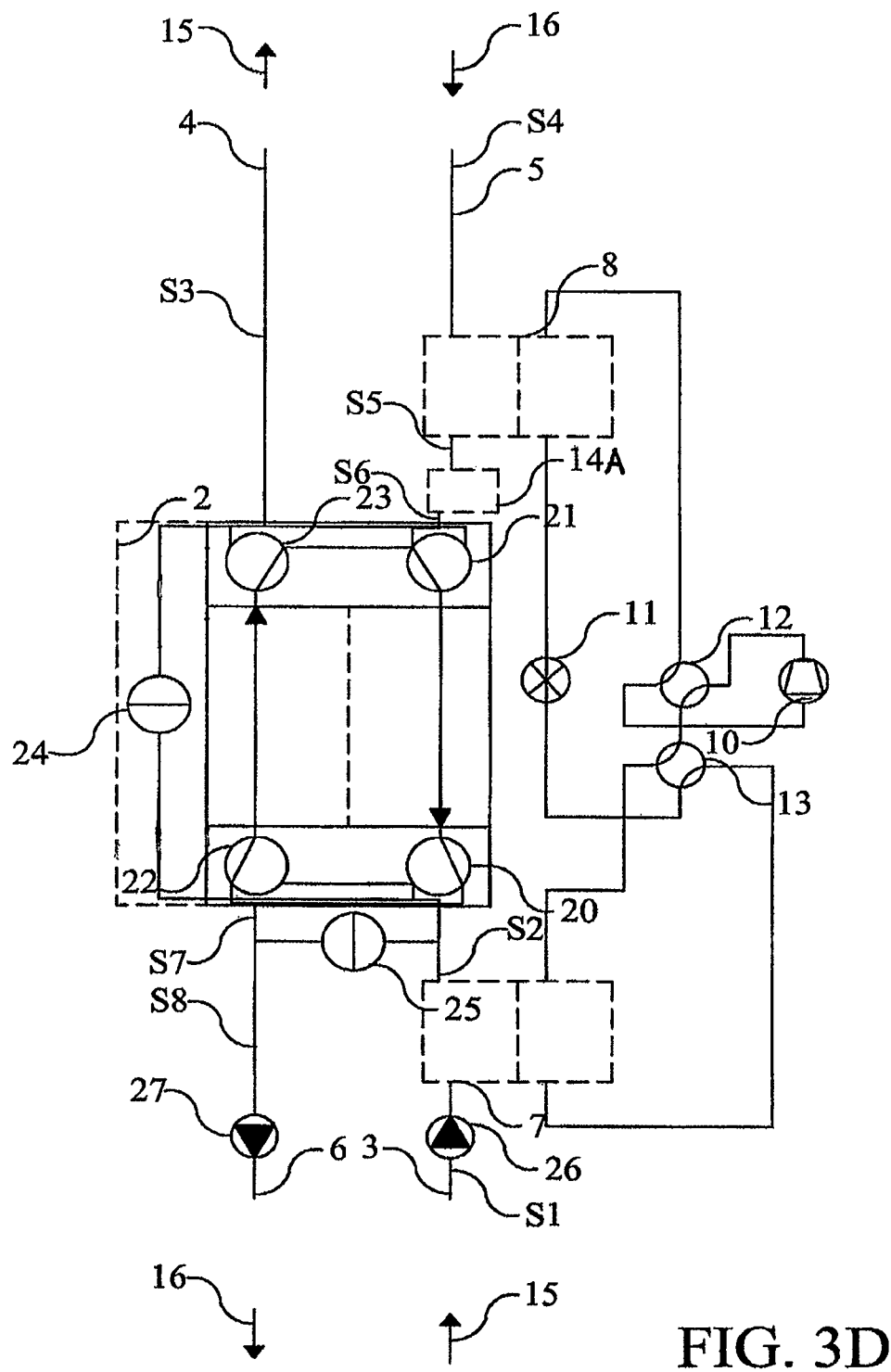
FIG. 3D: A diagram corresponding with FIG. 2, in which the medium flows are shown in the bypass mode.

FIG. 3D shows a diagram of the system whereby the second medium flow 16 completely bypasses the heat exchanger 2 and the first medium flow 15 flows through both sides of the heat exchanger 2, so that no heat or moisture is transferred. With respect to the valve state in FIG. 3BA, valves 22 and 23 are switched to the other state, while bypass valve 24 is fully opened. This state makes sense with small cooling capacities when the outside temperature is below the inside temperature or with small heating capacities when the outside temperature is above the inside temperature. When this cooling is insufficient, adiabatic cooling can be used first; when adiabatic cooling is insufficient, mechanical cooling can be used. In this way, an extra energy saving is achieved.

Figure 5:
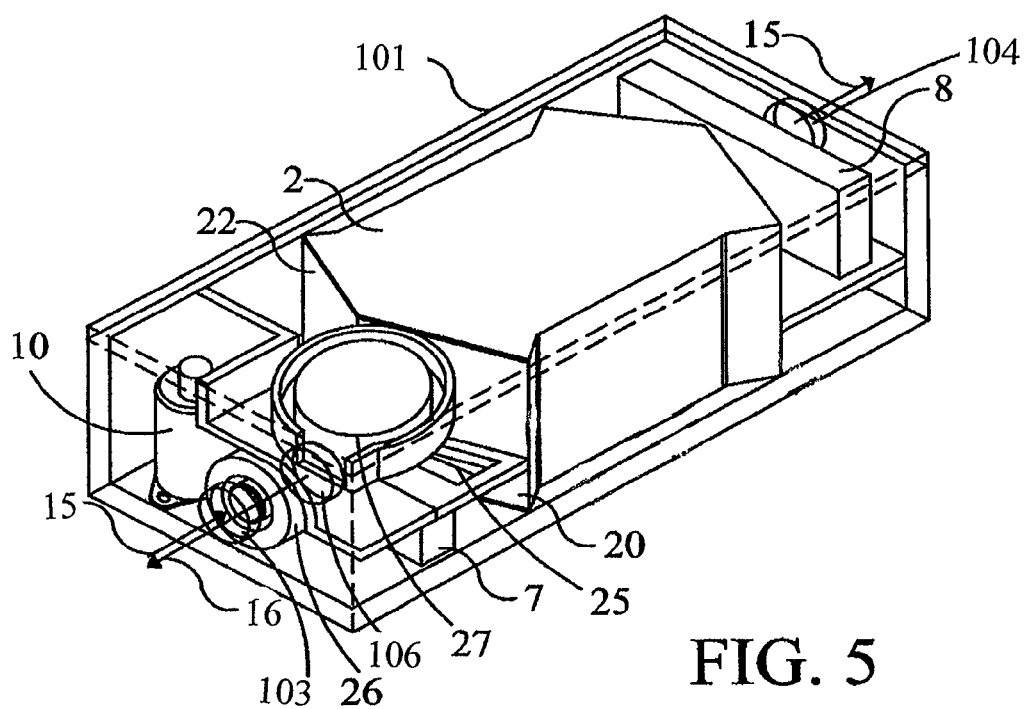
FIG. 5: A partly cut-away perspective schematic view of the embodiment, depicted in FIG. 2.

Finally, FIG. 5 shows a schematic perspective view of a device according to the invention. From this, it appears that such a device can easily be built in a compact form, so that it can be used as an air conditioning unit in offices, homes or camping vehicles.

The whole unit contains a box-shaped housing 101, in which a heat exchanger or recuperator is placed according to the principle of EP-A-1 485 657. In an end wall of the housing, connection 103 is fitted to supply outside air and outlet opening 106 is fitted for treated air on the outside. The first heat exchanger element 7 is fitted on the same side of heat exchanger 2, just as compressor 10 of the Carnot circuit and fans 26 and 27. The second heat exchanger element 8 is fitted on the other side of heat exchanger 2, just as outlet opening 104 for the treated air on the inside and connection of the inside air to be conditioned.

This and various other parts are connected together as shown in FIGS. 1A and 1B.

It should be clear that the embodiments of the invention shown can be deviated from in various ways without falling outside the protection of the patent.

The invention claimed is:

1. A device for the exchange of thermal energy between a first medium flow from an outside area to an inside area to be conditioned and a second medium flow from inside the area to be conditioned to outside the area, comprising:
   a. a heat exchanger placed between an outside area and an inside area;
   b. a first supply duct for the conduction of the first medium flow connecting the outside area to the heat exchanger;
   c. a first exhaust duct for the conduction of the first medium flow connecting the inside area to the heat exchanger;
   d. a second supply duct for the conduction of the second medium flow connecting the inside area to the heat exchanger, of which the direction of flow is opposite to that of the first medium flow;
   e. a second exhaust duct for the conduction of the second medium flow connecting the outside to the heat exchanger;
   f. a first heat exchanger element placed in either the first supply duct or the second exhaust duct; and
   g. a second heat exchanger element placed in either the second supply duct or the first exhaust duct,
   wherein the first and second heat exchanger elements are both included in a Carnot circuit comprising an expansion device and a compressor so as to transfer heat between the first and second heat exchanger elements,
   wherein the heat exchanger is adapted for the exchange of both thermal energy and phase transition energy,
   wherein the connections of the compressor and the expansion device in the Carnot circuit are exchangeable with respect to the heat exchanger elements, and
   wherein the Carnot circuit is adapted for the transfer of thermal energy in the same direction as the energy transfer of the first medium flow.

2. The device according to claim 1, wherein the device is switched to heat the area to be conditioned and that the first heat exchanger element is placed in the first supply duct.

3. The device according to claim 2, wherein the second heat exchanger element is placed in the first exhaust duct.

4. The device according to claim 2, wherein the connection of the first supply duct to the heat exchanger and the connection of the second exhaust duct are configured to connect together by a bypass connection.

5. The device according to claim 4, wherein the bypass connection comprises at least one valve present between the first supply duct and the heat exchanger or the second exhaust duct and the heat exchanger, wherein the at least one valve is adapted to be configured into an at least partly-opened position to enable flow through the bypass connection.

6. The device according to claim 1, wherein the device is switched to cool the area to be conditioned and that the first heat exchanger element is placed in the first supply duct.

7. The device according to claim 6, wherein the first heat exchanger element is switched to transfer heat from the Carnot circuit to air coming from the outside.

8. The device according to claim 7, wherein a recuperator is set for the counter phase control of the exchanger elements of the recuperator on the inside.

9. The device according to claim 6, further comprising a valve for reversing the direction of flow of the Carnot circuit in the first heat exchanger element.

10. The device according to claim 6, further comprising a bypass connection disposed between the first heat exchanger element and the second heat exchanger element.

11. The device according to claim 1, wherein the second supply duct and the second exhaust are connected together by a closable bypass connection.

12. The device according to claim 11, wherein valves present on a first side of the heat exchanger are adapted to at least partly close when the bypass connection is opened.

13. The device according to claim 11, wherein the first supply duct is connectable to both a first side and a second side of the heat exchanger and the first exhaust duct is connectable to both the first side and the second side of the heat exchanger.

14. The device according to claim 1, wherein the first exhaust duct and the first supply duct are connected together by a closable bypass connection.

15. The device according to claim 1, further comprising an evaporator disposed in the first exhaust duct between the heat exchanger and the second heat exchanger element.

16. The device according to claim 15, wherein the evaporator is placed in the second supply duct.

17. The device according to claim 1, further comprising a first transport pump disposed in the first supply duct and a second transport pump disposed in the second exhaust duct wherein the first transport pump in the first supply duct is disposed upstream from the first heat exchanger element.

18. The device according to claim 1, wherein the device is switched as an air conditioning device.

19. The device according to claim 18, wherein the air conditioning device is configured for installation in a camping vehicle.

20. The device according to claim 19, wherein, with heating the area to be conditioned, the first exhaust duct is set to direct the first medium to a ceiling of the area to be conditioned and the exhaust duct is set to exhaust the medium in the vicinity of the bottom of the area to be conditioned and that, with cooling the area to be conditioned, the first exhaust duct is set to direct the first medium to the bottom of the area to be conditioned and the second exhaust duct is set to exhaust the medium from the vicinity of the ceiling of the area to be conditioned.

21. The device according to claim 18, wherein the air conditioning device is configured for installation in a building.

* * * * *